(12) United States Patent
Wang et al.

(10) Patent No.: US 12,461,545 B2
(45) Date of Patent: Nov. 4, 2025

(54) INTELLIGENT LEARNING AND ADJUSTMENT SYSTEM FOR TENNIS TRAINING ROBOT

(71) Applicant: POTENT SPORTS & TECH CO., LTD, Jiangsu (CN)

(72) Inventors: Li Wang, Jiangsu (CN); Yong Zhang, Jiangsu (CN)

(73) Assignee: POTENT SPORTS & TECH CO., LTD., Jiangsu (CN)

( * ) Notice: Subject to any disclaimer, the term of this patent is extended or adjusted under 35 U.S.C. 154(b) by 85 days.

(21) Appl. No.: 18/632,111

(22) Filed: Apr. 10, 2024

(65) Prior Publication Data

US 2025/0238037 A1 Jul. 24, 2025

(30) Foreign Application Priority Data

Jan. 18, 2024 (CN) .......................... 202410073488.4

(51) Int. Cl.
| | |
|---|---|
| *G06V 10/82* | (2022.01) |
| *G05D 1/656* | (2024.01) |
| *G06V 20/56* | (2022.01) |
| *G06V 20/64* | (2022.01) |
| *G06V 40/20* | (2022.01) |
| *G05D 101/15* | (2024.01) |
| *G05D 101/20* | (2024.01) |
| *G05D 105/60* | (2024.01) |
| *G05D 111/10* | (2024.01) |

(52) U.S. Cl.
CPC ............. *G05D 1/656* (2024.01); *G06V 10/82* (2022.01); *G06V 20/56* (2022.01); *G06V 20/64* (2022.01); *G06V 40/23* (2022.01); *G05D 2101/15* (2024.01); *G05D 2101/20* (2024.01); *G05D 2105/60* (2024.01); *G05D 2111/10* (2024.01)

(58) Field of Classification Search
CPC .............. G05D 1/656; G05D 2105/60; G05D 2101/15; G05D 2101/20; G05D 2111/10; G06V 20/64; G06V 10/82; G06V 40/23; G06V 20/56
See application file for complete search history.

(56) References Cited

FOREIGN PATENT DOCUMENTS

CN           206577345 U    10/2017

*Primary Examiner* — Mathew Franklin Gordon
(74) *Attorney, Agent, or Firm* — MUNCY, GEISSLER, OLDS & LOWE, P.C.

(57) ABSTRACT

Disclosed is an intelligent learning and adjustment system for a tennis training robot, including an image recognition system, an algorithm model, a back-end processing platform, and an optimization model. Preprocessing of incoming ball data is performed, various necessary data, such as speeds and directions of flying tennis balls, spinning and placements, are collected, various data sets are processed by using various machine learning algorithms, effective predictions and decisions are generated to facilitate the prediction of the placement and difficulty level of the incoming ball, so that a capability and level of a sparring athlete can be evaluated, the tennis training robot accordingly makes prediction and recognition, and carries out interactive feedback actions in a timely manner. The entire training process involves continuously updating of weights and bias values to make the predictions increasingly accurate, and the tennis training robot can provide an interactive intelligent training method.

5 Claims, 1 Drawing Sheet

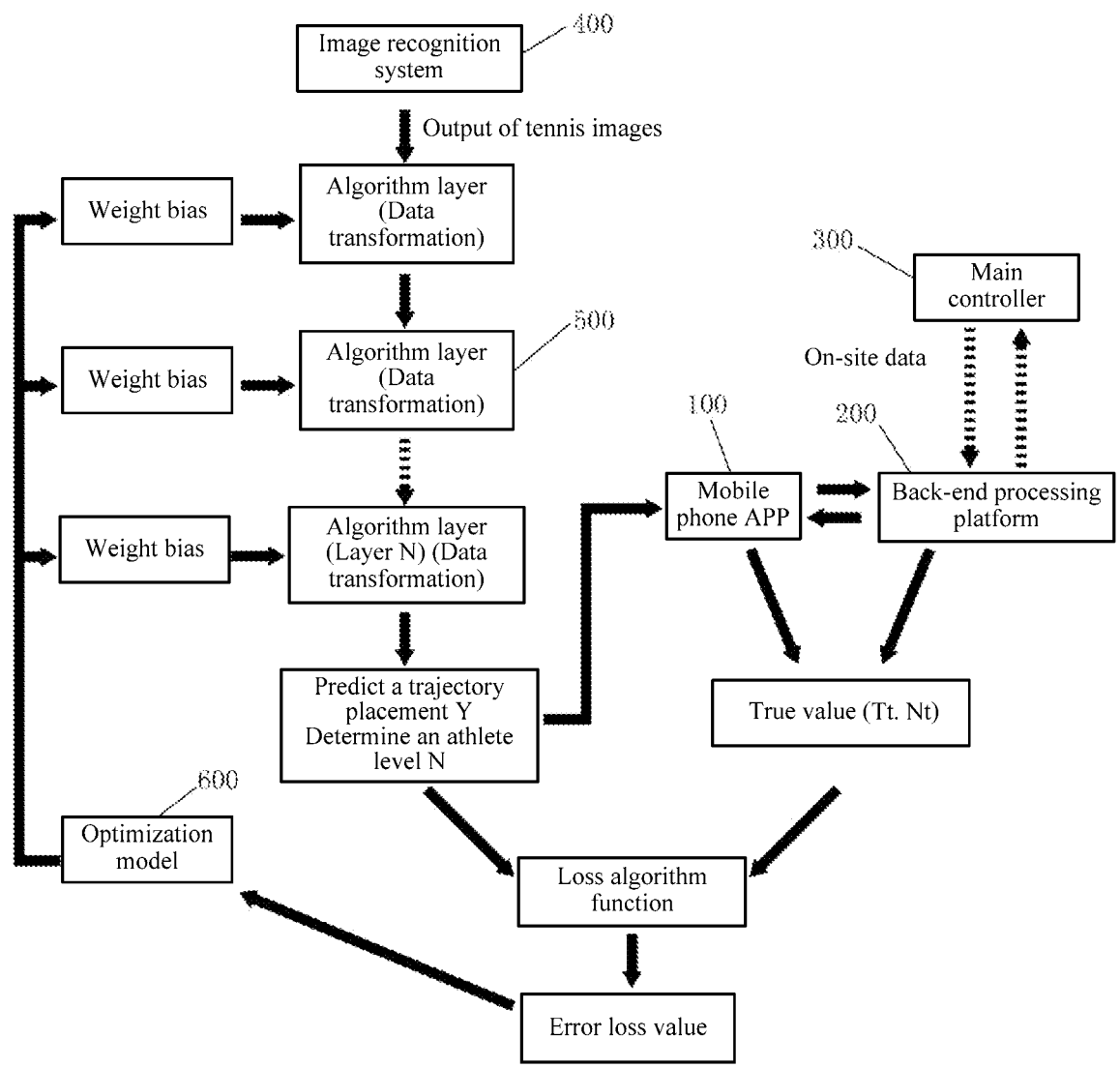

INTELLIGENT LEARNING AND ADJUSTMENT SYSTEM FOR TENNIS TRAINING ROBOT

TECHNICAL FIELD

The present disclosure relates to tennis training equipment, and particularly relates to an intelligent learning and adjustment system for a tennis training robot.

BACKGROUND

In recent years, tennis in China has entered a stage of rapid development, more and more people have accessed to and participated in tennis training. A key point of tennis training is to train a player's basic movements of hitting a ball, such as serving and hitting the ball.

Various tennis training devices have been developed in the prior art to meet the needs of individual training. A tennis ball device disclosed in the patent CN 206577345 U has a serving function, but has great limitations, as it can only serve tennis balls with fixed force in a fixing direction, but it cannot realize trick shots with rotation, or predict placements of incoming tennis balls, therefore, it is unable to evaluate a level of a sparring athlete, and it is thus impossible to serve a ball in a targeted manner, limiting the training purpose and efficiency.

SUMMARY

In order to solve the problem of limitations on ball serving modes, the present disclosure provides an intelligent learning and adjustment system for a tennis training robot, so that the tennis training robot can perform motion positioning to serve a tennis ball, and simulate ball returning of the corresponding level according to information of an incoming ball.

The present disclosure provides the following technical solution:

an intelligent learning and adjustment system for a tennis training robot in the present disclosure includes an image recognition system, an algorithm model, a back-end processing platform, and an optimization model;

the image recognition system is configured to capture data of tennis balls, such as three-dimensional coordinates, speeds, and speed directions of a plurality of points, the algorithm model is configured to calculate trajectories of incoming balls according to the captured data to predict placements of the incoming balls, and the trajectories are captured to facilitate the prediction of true placements of the incoming balls by the back-end processing platform;

the algorithm model has a plurality of algorithm layers, and performs predication and classification according to features of tennis image data inputted by the image recognition system;

error loss values between prediction data and true data are calculated by a calculation model according to data of the placements of the incoming balls and athlete levels obtained through transformation operation of data at an algorithm layer, on-site subsequent data received by the back-end processing platform from a main controller, and true values of data from a mobile phone APP, and the back-end processing platform feeds back the error loss values to the optimization model for data optimization, such that the prediction capability of the system is improved; and the optimization model expands and improves a database according to accumulative data of ball hitting of athletes and feedback on whether the prediction are accurate, provides model training and evaluation functions, such that the tennis training robot is capable of independently evaluating the performance of the athletes on tasks, and the algorithm is optimized based on the extracted evaluation features.

features of the data: since a tennis ball in motion usually spins, a trajectory thereof is defected in direction to some extent, while the algorithm model is capable of comparing two points in a space where the tennis ball moves with corresponding two points in an ideal case to predict which type of spinning it belongs to, and a flight trajectory and a placement of the tennis ball can be predicted according to the type of spinning.

Predication and classification: preprocessing of incoming ball data is performed, various necessary data, such as a position of a tennis player after each ball hitting, angles of ball hitting, speeds and directions of flying tennis balls, spinning and placements, are collected, various data sets are processed by using various machine learning algorithms, effective predictions and decisions are generated to facilitate the prediction of the placement and difficulty level of the incoming ball, so that a capability and level of a sparring athlete can be evaluated.

The error loss values are obtained by a loss algorithm function, which is obtained according to the on-site subsequent data received by the back-end processing platform from the main controller, true values of data from the mobile phone APP, and the predicted trajectories and placements of the incoming balls, and the athlete levels.

The intelligent learning and adjustment system obtains mapping relationships between inputs and outputs through learning, and the entire training process of the tennis training robot involves continuously updating of weights and bias values.

Compared with the prior art, the present disclosure has the following beneficial effects: in the intelligent learning and adjustment system for a tennis training robot in the present disclosure, preprocessing of the incoming ball data, such as cleaning of incoming ball data, feature extraction, and data standardization, is performed, various necessary data, such as speeds and directions of flying tennis balls, spinning and placements, are collected step by step, various data sets are processed by using various machine learning algorithms, effective predictions and decisions are generated to facilitate the prediction of the placement and difficulty level of the incoming ball, so that a capability and level of a sparring athlete can be evaluated, the tennis training robot accordingly makes prediction and recognition, and carries out interactive feedback actions in a timely manner. The entire training process involves continuously updating of weights and bias values to make the predictions increasingly accurate, and the tennis training robot can provide an interactive intelligent training method.

BRIEF DESCRIPTION OF THE DRAWINGS

The sole FIGURE is a schematic principle of the present disclosure.

Reference numerals in the accompanying drawings: 100. mobile phone APP; 200. back-end processing platform; 300. main controller; 400. image recognition system; 500. algorithm model; and 600. optimization model.

DETAILED DESCRIPTIONS OF THE EMBODIMENTS

The technical solutions of embodiments of the present disclosure will be described below clearly and comprehensively in conjunction with accompanying drawings of the embodiments of the present disclosure. Apparently, the embodiments described are merely some embodiments rather than all embodiments of the present disclosure. All the other embodiments obtained by those of ordinary skill in the art based on the embodiments in the present disclosure without creative efforts shall fall within the scope of protection of the present disclosure.

With reference to the sole FIGURE, an intelligent learning and adjustment system for a tennis training robot in the present disclosure includes an image recognition system 400, an algorithm model 500, a back-end processing platform 200, and an optimization model 600;

the image recognition system 400 is configured to capture data of tennis balls, such as three-dimensional coordinates, speeds, and speed directions of a plurality of points, the algorithm model is configured to calculate trajectories of incoming balls according to the captured data to predict placements of the incoming balls, and the trajectories are captured to facilitate the prediction of true placements of the incoming balls by the back-end processing platform;

the algorithm model 500 has a plurality of algorithm layers, and performs predication and classification according to features of tennis image data inputted by the image recognition system;

features of the data: since a tennis ball in motion usually spins, a trajectory thereof is defected in direction to some extent, while the algorithm model is capable of comparing two points in a space where the tennis ball moves with corresponding two points in an ideal case to predict which type of spinning it belongs to.

A corresponding mechanical model and a corresponding motion model are used to predict a flight trajectory and a placement of the tennis ball according to a specific spinning type.

Predication and classification: preprocessing of incoming ball data, such as cleaning of incoming ball data, feature extraction, and data standardization, is performed, various necessary data, such as a position of a tennis player after each ball hitting, angles of ball hitting, speeds and directions of flying tennis balls, spinning and placements, are collected step by step, various data sets are processed by using various machine learning algorithms, such as classification, regression, clustering, and dimensionality reduction, effective predictions and decisions are generated to facilitate the prediction of the placement and difficulty level of the incoming ball, so that a capability and level of a sparring athlete can be evaluated.

Error loss values between prediction data and true data are calculated by a calculation model according to data of the placements of the incoming balls and athlete levels obtained through transformation operation of data at an algorithm layer, on-site subsequent data received by the back-end processing platform from a main controller 300, and true values of data from a mobile phone APP 100, and the back-end processing platform 200 feeds back the error loss values to the optimization model 600 for data optimization, such that the prediction capability of the system is improved; and the tennis training robot accordingly makes prediction and recognition, and carries out interactive feedback actions in a timely manner.

The optimization model 600 further expands and improves a database according to accumulative data of ball hitting of athletes and feedback on whether the prediction are accurate, and provides model training and evaluation functions based on the increasingly enriched database, such that the tennis training robot is capable of independently evaluating the performance of the athletes on tasks, prediction accuracy of the placements of the tennis balls is continuously improved by extracting evaluation features and optimizing the algorithm, and the accuracy of prediction of balls serving by the athletes is improved.

An error loss value is obtained by a loss algorithm function, and the loss algorithm function is obtained based on a true value (Tt·Nt), a trajectory placement of an incoming ball Y and an athlete level N outputted by the mobile phone APP and the back-end processing platform.

The selection of the loss function depends on many factors, including processing of outliers, selection of a deep learning algorithm model, time efficiency of gradient descent, and the like, and the system constructs the loss function by using regression loss algorithms such as mean square error (MSE) and mean absolute error (MAE).

The mean square error (MSE) is a commonly used loss function in regression, representing an average of a sum of squared distances between predicted values and true values, with a formula as follows:

$$MSE = (1/n) * \sum (yi - \hat{y}i)^2$$

where MSE represents a mean square error, n represents a number of samples, yi represents a true value, ŷi represents a predicted value, and X represents a summation operation.

The mean absolute error (MAE) is also a loss function for a regression model. The MAE refers to an average of absolute differences between the predicted values and the true values (while the MSE involves an average of a sum of squared distances). Therefore, the MAE represents an average magnitude of the predicted values, regardless of a direction. When the direction is taken into account, it could be defined as a mean bias error (MBE), which refers to an average of a sum of residuals/errors. The formula for the mean absolute error is as follows:

$$MAE = (1/n) * \sum |\text{Predicted values} - \text{True values}|$$

where n represents a number of samples, X represents a summation operation, and lxi denotes an absolute value of x.

The loss algorithm function is used to measure a distance between a predicted result and a true result of a neural network, thereby guiding the optimization of model parameters.

The International Tennis Federation (ITF) divides the tennis levels into 1 to 7 levels, with level 1 being the highest level, and level 7 being the lowest level. Each level has corresponding standards and requirements, and an athlete needs to gradually improve his/her level through a series of matches and assessments.

The intelligent learning and adjustment system obtains mapping relationships between inputs and outputs through learning, and the entire training process involves continuously updating of weights and bias values to make the predictions increasingly accurate.

A three-dimensional coordinate system by taking a midpoint of a bottom line is taken as an origin of coordinates, making an x axis parallel to a direction of the bottom line, an y axis parallel to a direction of a side line direction, an z axis vertically upwards, with a unit length being meter.

Timing is started from the time of throwing of a tennis ball, and the tennis ball is located at a point $(x_0, y_0, z_0)$ at the time of throwing; $v_0$ represents an initial speed of the tennis ball, t represents time of motion, r represents a displacement vector, $\alpha$ is an included angle between $v_0$ and the x axis, $\beta$ is an included angle between $v_0$ and the y axis, and $\gamma$ is an included angle between $v_0$ and the z axis. According to the following formula:

$$x = x_0 + v_0\cos\alpha \frac{v_0\cos\gamma + \sqrt{v_0^2\cos^2\gamma + 2gz_0}}{g}$$

$$y = y_0 + v_0\cos\beta \frac{v_0\cos\gamma + \sqrt{v_0^2\cos^2\gamma + 2gz_0}}{g}$$

Therefore, it can be calculated that a placement is (x, y, 0).

Under the condition that the tennis ball passes through a point $(x_N, y_N, z_N)$, since a tennis ball in motion usually spins, a trajectory thereof is defected in direction to some extent, and the placement of the tennis ball needs to be predicted again. A direction of angular velocity (spinning direction) of the tennis ball can be predicted according to a deviation distance of the tennis ball.

Spinning of the tennis ball can generally be categorized into two types: topspin or backspin, and left sidespin or right sidespin.

The main controller 300 performs motion positioning to serve a tennis ball, and simulates ball returning of the corresponding level according to the information from the back-end processing platform 200, the prediction accuracy of the placement of the tennis ball is continuously improved by optimizing the model, and the accuracy of prediction of balls serving by the athlete is improved, such that precise control of ball serving, such as speed and placement of service, flat serving, high toss serving, and spin serving, can be achieved.

Although the embodiments of the present disclosure have been illustrated and described, it should be understood that those of ordinary skill in the art may make various changes, modifications, replacements and variations to the above embodiments without departing from the principle and spirit of the present disclosure, and the scope of the present disclosure is limited by the appended claims and their legal equivalents.

What it claimed is:

1. An intelligent learning and adjustment system for a tennis training robot, comprising an image recognition system, an algorithm model, a back-end processing platform, and an optimization model;

the image recognition system is configured to capture data of tennis balls, such as three-dimensional coordinates, speeds, and speed directions of a plurality of points, and the algorithm model is configured to calculate trajectories of incoming balls according to the captured data to predict placements of the incoming balls;

the algorithm model has a plurality of algorithm layers, and performs predication and classification according to features of tennis image data inputted by the image recognition system;

error loss values between prediction data and true data are calculated by a calculation model according to data of the placements of the incoming balls and athlete levels obtained through transformation operation of data at an algorithm layer, on-site subsequent data received by the back-end processing platform from a main controller, and true values of data from a mobile phone APP, and the back-end processing platform feeds back the error loss values to the optimization model for data optimization; and the optimization model expands and improves a database according to accumulative data of ball hitting of athletes and feedback on whether predictions are accurate, and provides model training and evaluation functions, such that the tennis training robot is capable of independently evaluating the performance of the athletes on tasks, and the algorithm is optimized based on the extracted evaluation features.

2. The intelligent learning and adjustment system for a tennis training robot according to claim 1, wherein features of the data: since a tennis ball in motion usually spins, a trajectory thereof is defected in direction to some extent, while the algorithm model is capable of comparing two points in a space where the tennis ball moves with corresponding two points in an ideal case to predict which type of spinning it belongs to, and a flight trajectory and a placement of the tennis ball can be predicted according to the type of spinning.

3. The intelligent learning and adjustment system for a tennis training robot according to claim 1, wherein predication and classification: preprocessing of incoming ball data is performed, various necessary data, such as a position of a tennis player after each ball hitting, angles of ball hitting, speeds and directions of flying tennis balls, spinning and placements, are collected, various data sets are processed by using various machine learning algorithms, effective predictions and decisions are generated to facilitate the prediction of the placements and difficulty levels of the incoming balls, so that capabilities and levels of sparring athletes can be evaluated.

4. The intelligent learning and adjustment system for a tennis training robot according to claim 1, wherein the error loss values are obtained by a loss algorithm function, which is obtained according to the on-site subsequent data received by the back-end processing platform from the main controller, the true values of data from the mobile phone APP, and the predicted trajectories and placements of the incoming balls, and the athlete levels.

5. The intelligent learning and adjustment system for a tennis training robot according to claim 1, wherein the intelligent learning and adjustment system obtains mapping relationships between inputs and outputs through learning, and the entire training process of the tennis training robot involves continuously updating of weights and bias values.

* * * * *